United States Patent
Ishii et al.

(10) Patent No.: US 6,924,859 B2
(45) Date of Patent: Aug. 2, 2005

(54) LIQUID CRYSTAL DISPLAY APPARATUS SERVING BOTH AS TRANSMISSION TYPE AND REFLECTION TYPE AND METHOD OF MANUFACTURING THE SAME

(75) Inventors: Hiromitsu Ishii, Hamura (JP); Shintaro Kuwayama, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 15 days.

(21) Appl. No.: 10/353,890

(22) Filed: Jan. 29, 2003

(65) Prior Publication Data

US 2003/0142255 A1 Jul. 31, 2003

(30) Foreign Application Priority Data

Jan. 31, 2002 (JP) ...................................... 2002-023590

(51) Int. Cl.$^7$ ..................... G02F 1/1335; G02F 1/1343
(52) U.S. Cl. ........................... 349/114; 349/39; 349/112
(58) Field of Search ........................... 349/112–114, 46, 349/39, 138, 43

(56) References Cited

U.S. PATENT DOCUMENTS

| 6,532,045 | B2 | 3/2003 | Chung et al. |
| 6,614,496 | B1 * | 9/2003 | Song et al. ................. 349/114 |
| 6,693,692 | B1 * | 2/2004 | Kaneko et al. ............ 349/117 |

FOREIGN PATENT DOCUMENTS

KR    2001-0060808 A    7/2001

* cited by examiner

*Primary Examiner*—Toan Ton
(74) *Attorney, Agent, or Firm*—Frishauf, Holtz, Goodman & Chick, P.C.

(57) ABSTRACT

There is provided a liquid crystal display apparatus including a first substrate, a second substrate having an inner surface opposing the first substrate. A liquid crystal is placed between the first and second substrates. A plurality of light-transmitting pixel electrodes are arranged between the inner surface of the second substrate and the liquid crystal. A reflecting layer is placed between each pixel electrode and the inner surface of the second substrate and has an area smaller than that of the pixel electrode.

18 Claims, 14 Drawing Sheets

LIQUID CRYSTAL DISPLAY APPARATUS SERVING BOTH AS TRANSMISSION TYPE AND REFLECTION TYPE AND METHOD OF MANUFACTURING THE SAME

CROSS-REFERENCE TO RELATED APPLICATIONS

This application is based upon and claims the benefit of priority from the prior Japanese Patent Application No. 2002-023590, filed Jan. 31, 2002, the entire contents of which are incorporated herein by reference.

BACKGROUND OF THE INVENTION

1. Field of the Invention

The present invention relates to a liquid crystal display apparatus serving both as a transmission type and a reflection type and a method of manufacturing the same.

2. Description of the Related Art

As a liquid crystal display apparatus serving both as a transmission type and a reflection type, an apparatus using translucent pixel electrodes and half-reflecting pixel electrodes is known. In such a liquid crystal display apparatus, in general, a liquid crystal is sealed between first and second substrates, a plurality of transparent pixel electrodes are arranged in a matrix form on an inner surface of the second substrate which is opposite to the display surface side of the two substrates, a half mirror is formed on the surface of each transparent pixel electrode, and a backlight is placed on the outer surface side of the second substrate.

When the above conventional liquid crystal display apparatus is to be used as a transmission type, the backlight is turned on. Light from the backlight is transmitted through the second substrate, transparent pixel electrodes, half mirrors, liquid crystal, and the first substrate on the display surface side, and emerges from the display surface side of the first substrate, thereby performing display operation.

When the above conventional liquid crystal display apparatus is to be used as a reflection type, the backlight is not turned on. In this case, external light incident from the display surface side of the first substrate is transmitted through the first substrate and liquid crystal and is reflected by the half mirrors. The reflected light is sequentially transmitted through the liquid crystal and first substrate and emerges from the display surface side of the first substrate, thereby performing a display operation.

For example, half mirrors in the above conventional liquid crystal display apparatus are formed as follows. A high-reflectance thin metal film made of aluminum or the like is formed by a sputtering method on an insulating film and a plurality of pixel electrodes formed on the insulating film. Fine holes are then formed in the thin metal film by a photolithographic method, and portions of the thin metal film which do not correspond to the pixel electrodes are removed. With this process, half mirrors formed from the thin metal film having fine holes are formed on the surfaces of the respective transparent pixel electrodes.

According to another method of forming half mirrors, a high-reflectance thin metal film having defective portions is formed by the sputtering method on an insulating film and a plurality of transparent pixel electrodes formed on the insulating film. Portions of the thin metal film which do not correspond to the pixel electrodes are then removed by the photolithographic method. With this process, half mirrors formed from the thin metal film having defective portions are formed on the surfaces of the respective transparent pixel electrodes.

According to the above conventional liquid crystal display apparatus, half mirrors are formed in the dedicated manufacturing steps, and hence the number of manufacturing steps is large, leading to an increase in cost.

BRIEF SUMMARY OF THE INVENTION

It is, therefore, an object of the present invention to provide a liquid crystal display apparatus which can decrease the number of manufacturing steps, and a method of manufacturing the same. According to the present invention, there is provided a liquid crystal display apparatus comprising:

a first substrate;

a second substrate having an inner surface opposing the first substrate;

a liquid crystal placed between the first and second substrates;

a plurality of light-transmitting pixel electrodes arranged between the inner surface of the second substrate and the liquid crystal; and a reflecting layer which is placed between each pixel electrode and the inner surface of the second substrate and has an area smaller than an area of the pixel electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an enlarged plan view of the thin-film transistor substrate of the liquid crystal display apparatus in FIG. 1 with the respective layers being seen through;

DETAILED DESCRIPTION OF THE INVENTION (First Embodiment)

Figure 1:
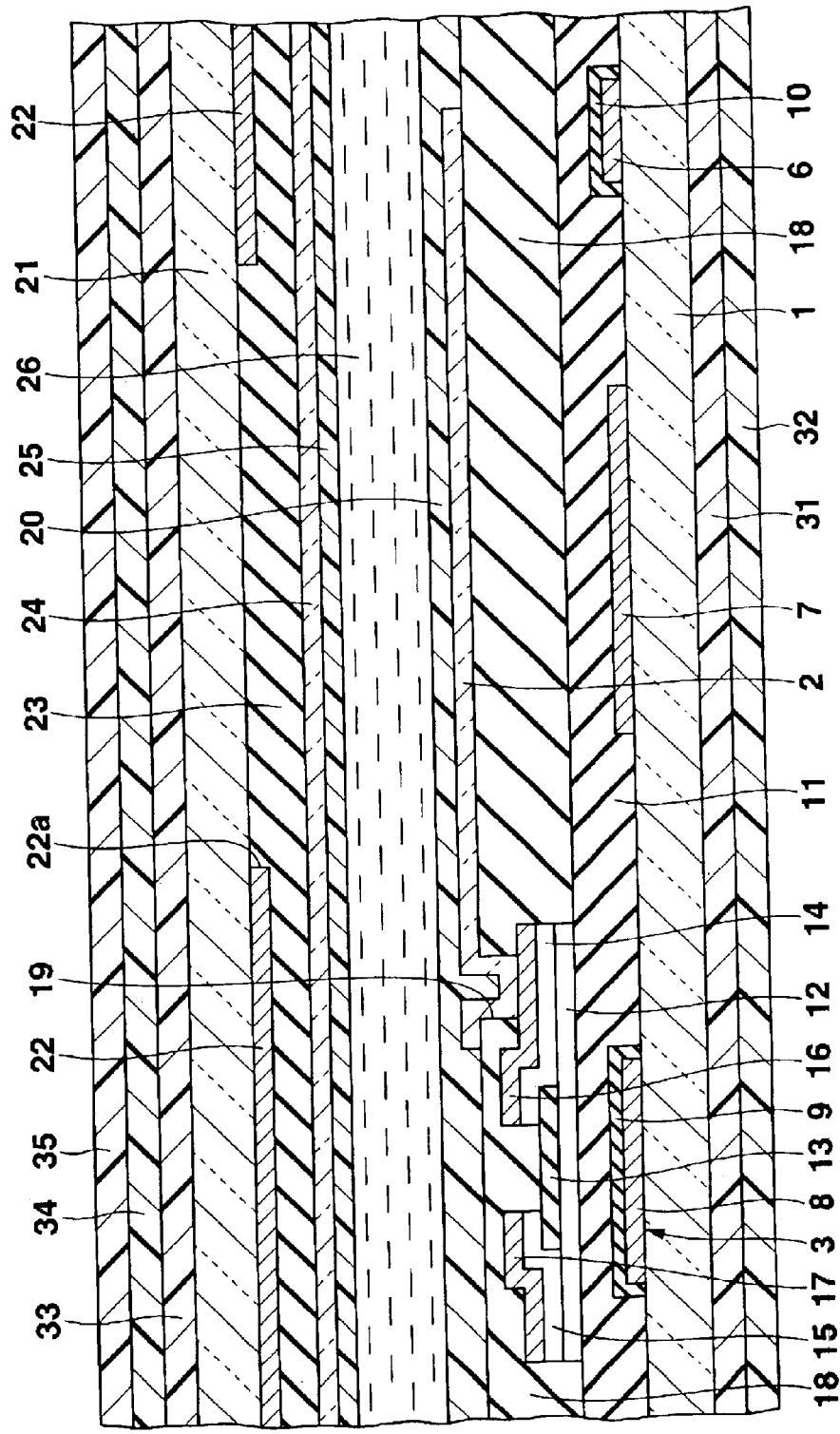
FIG. 1 is an enlarged sectional view of part (taken along a line I—I in FIG. 2) of a liquid crystal display apparatus according to a first embodiment of the present invention.
Figure 2:
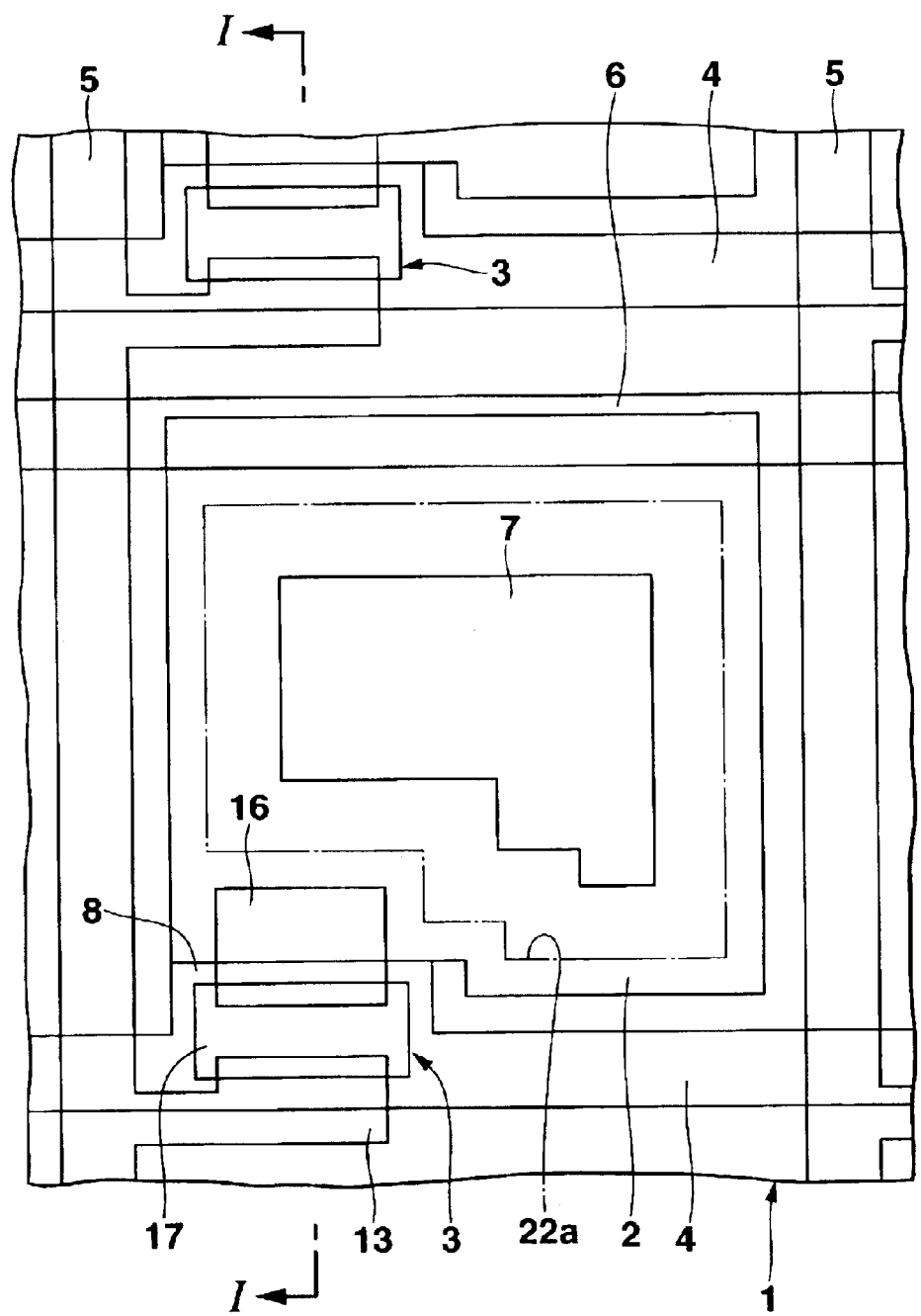

FIG. 1 is an enlarged sectional view of part (taken along a line I—I in FIG. 2) of a liquid crystal display apparatus according to a first embodiment of the present invention. FIG. 2 is a plan view showing a part of the liquid crystal display apparatus on thin-film transistor substrate side with the respective layers being seen through.

This liquid crystal display apparatus includes a thin-film transistor substrate or second substrate 1 and a counter substrate or first substrate 21. The following are formed on the upper surface of the second substrate 1: a plurality of pixel electrodes 2 arranged in the form of a matrix; a plurality of thin-film transistors 3 respectively connected to the pixel electrodes 2; a plurality of scanning lines 4 which are so arranged as to extend in the row direction and supply scanning signals to the thin-film transistors 3; a plurality of data lines 5 which are so arranged as to extend in the column direction and supply data signals to the thin-film transistors 3; a plurality of auxiliary capacitance lines 6 which are so arranged as to extend in the row direction and form auxiliary capacitance portions at portions where the auxiliary capacitance lines 6 overlap the respective pixel electrodes 2; and a plurality of reflecting layers 7 which are arranged at positions where they overlap almost central portions of the respective pixel electrodes 2.

The scanning lines 4 including gate electrodes 8 are each made of a non-light-transmitting material such as an aluminum-based metal including aluminum, an aluminum alloy, and the like. The auxiliary capacitance lines 6, and the reflecting layers 7 are formed at predetermined portions of the upper surface of the second substrate 1. In this case, anodized films 9 and 10 are formed on the upper surfaces of the scanning lines 4 including the gate electrodes 8 and the surfaces of the auxiliary capacitance lines 6, but no anodized films are formed on the surfaces of the reflecting layers 7.

A gate insulating film 11 made of silicon nitride is formed on the entire upper surface of the second substrate 1 including the upper surfaces of the gate electrodes 8 and the like. Thin semiconductor films 12 made of intrinsic amorphous silicon are formed on predetermined portions of the upper surface of the gate insulating film 11 which almost correspond to the gate electrodes 8. A channel protective film 13 made of silicon nitride is formed on an almost middle portion of the upper surface of each thin semiconductor film 12.

Ohmic contact layers 14 and 15 made of n-type amorphous silicon are formed on both sides of the upper surface of the channel protective film 13 and the upper surface of the thin semiconductor film 12 on the two sides of the channel protective film 13. A source electrode 16 made of an aluminum-based metal or the like is formed on the upper surface of the ohmic contact layer 14. The data lines 5 including drain electrodes 17 made of an aluminum-based metal are formed on the upper surfaces of the other ohmic contact layer 15 and predetermined portions of the upper surface of the gate insulating film 11.

The thin-film transistor 3 is comprised of the gate electrode 8, the anodized film 9, part of the gate insulating film 11, the thin semiconductor film 12, the channel protective film 13, the ohmic contact layers 14 and 15, the source electrode 16, and the drain electrode 17.

An overcoat film 18 made of silicon nitride is formed on the entire upper surfaces of the gate electrodes 8 including the upper surfaces of the thin-film transistors 3. A contact hole 19 is formed in a portion of the overcoat film 18 which corresponds to a predetermined portion of the source electrode 16. The transparent pixel electrode 2 made of ITO is so formed on the overcoat film 18 as to entirely cover the non-light-emitting reflecting layer 7. The pixel electrode 2 is connected to the source electrode 16 through the contact hole 19. An aligning film 20 is formed on the upper surface of the overcoat film 18 including the upper surfaces of the pixel electrodes 2.

Black masks 22 and color filters 23 of red, green, and blue are formed on the lower surface of the first substrate 21. A counter electrode 24 is formed on the lower surfaces of these components. An aligning film 25 is formed on the lower surface of the counter electrode 24. The first substrate 21 and second substrate 1 are bonded to each other through a seal member (not shown) located near the peripheral portion thereof. A liquid crystal 26 is sealed between the aligning films 20 and 25 of the substrates 1 and 21 inside the seal member. Referring to FIG. 2, a region enclosed with one-dot dash lines is an opening portion 22a of the black mask 22 formed on the counter substrate 21. The opening portion 22a is located within the pixel electrode 2, has an area smaller than that of the pixel electrode 2, is located outside the reflecting layer 7, and has an area larger than that of the reflecting layer 7.

A retardation plate 31 is bonded to the lower surface of the second substrate 1. A polarizing plate 32 is bonded to the lower surface of the retardation plate 31. A diffusion film 33 is bonded to the upper surface of the first substrate 21. A retardation plate 34 is bonded to the upper surface of the diffusion film 33. A polarizing plate 35 is bonded to the upper surface of the retardation plate 34.

As described above, in this liquid crystal display apparatus, the reflecting layer 7 which is made of a non-light-transmitting material and has an area smaller than that of the pixel electrode 2 is formed below the central portion of the light-transmitting pixel electrode 2 through the overcoat film (insulating film) 18 and gate insulating film 11. In addition, as indicated by the one-dot dash lines in FIG. 2, the area of the opening portion 22a of the black mask 22 is set to be smaller than that of the pixel electrode 2 and larger than that of the reflecting layer 7. With this structure, in the region of each pixel electrode 2, the reflecting layer 7 overlapping the central portion of the pixel electrode 2 forms a reflecting portion, and a portion where the pixel electrode 2 and reflecting layer 7 do not overlap in the opening portion 22a of the black mask 22 forms a light-transmitting portion. The area of the non-light-transmitting reflecting layer 7 is preferably about 35% to 65% of the area of the above light-transmitting portion. It is preferable that this area be arbitrarily set in accordance with the operating environment. For example, when importance is given to the use of the apparatus in a bright place, this area is set to be large. whereas when importance is given to the use in a dark place, the area is set to be small.

Assume that this liquid crystal display apparatus is to be used as a transmission type. In this case, when the backlight (not shown) placed on the lower surface side of the polarizing plate 32 below the second substrate 1 is turned on, light from the backlight is transmitted through the polarizing plate 32, the retardation plate 31, the second substrate 1, portions of the films 11 and 18 and the pixel electrode 2 which are located around the reflecting layer 7, i.e., the above light-transmitting portion, the aligning film 20, the liquid crystal 26, the aligning film 25, the counter electrode 24, the color filter 23, the first substrate 21, the diffusion film 33, the retardation plate 34, and the polarizing plate 35 and emerges from the upper surface side (display surface side) of the polarizing plate 35, thereby performing display operation.

Assume that this liquid crystal display apparatus is used as reflection type. In this case, the backlight is not turned on, and external light incident from the upper surface side of the polarizing plate 35 on the first substrate 21 is transmitted through the polarizing plate 35, retardation plate 34, diffusion film 33, substrate 21, color filter 23, counter electrode 24, aligning film 25, liquid crystal 26, aligning film 20, pixel electrode 2, and films 18 and 11 and is reflected by the reflecting layer 7. This reflected light emerges from the upper surface side of the polarizing plate 35 on the first substrate 21 through an optical path reverse to that in the above operation, thereby performing display operation.

Figure 3:
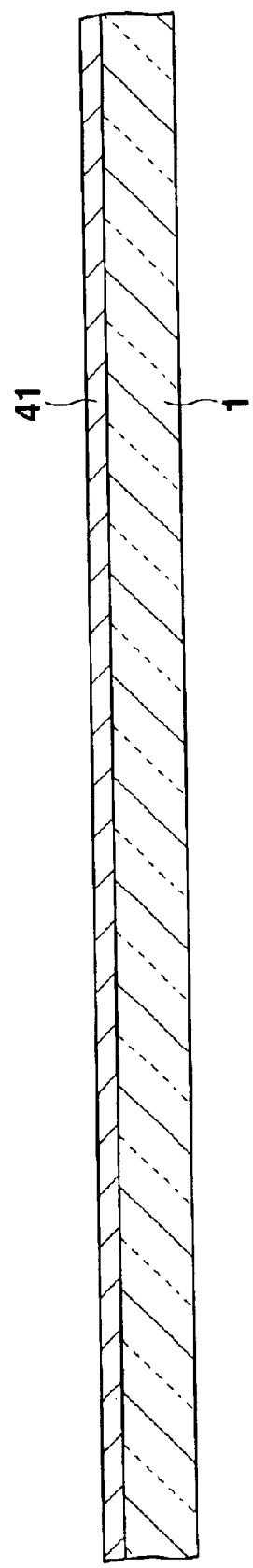
FIG. 3 is an enlarged sectional view for explaining a first manufacturing step in manufacturing the thin-film transistor substrate of the liquid crystal display apparatus shown in FIGS. 1 and 2.
Figure 4:
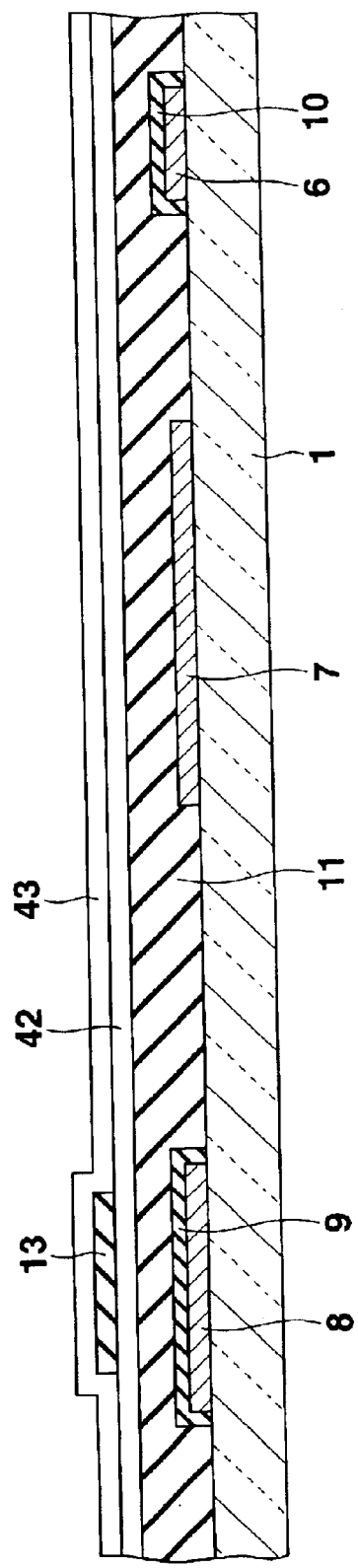
FIG. 4 is an enlarged sectional view for explaining a manufacturing step following the step in FIG. 3.

An example of a manufacturing method for a section of the liquid crystal display apparatus on the transistor substrate 1 side, shown in FIGS. 1 and 2 will be described next. First of all, as shown in FIG. 3, a metal film 41 made of a high-reflectance material such as an aluminum-based material or silver is formed on the entire supper surface of the second substrate 1 by the sputtering method. The metal film 41 is then patterned by the photolithographic method to form the auxiliary capacitance lines 6, the reflecting layers 7, and the scanning lines 4 including the gate electrodes 8, as shown in FIG. 4.

In this case, as shown in FIG. 2, the reflecting layer 7 is formed into an independent island shape isolated from the auxiliary capacitance line 6 and the scanning line 4 including the gate electrode 8. Since the reflecting layer 7 is formed by using the same material as that for the gate electrode 8 or the like, i.e., the high-reflectance metal film 41, at the same time as the formation of the gate electrode 8 or the like, an increase in manufacturing steps can be prevented. As compared with the case wherein conventional half mirrors are manufactured in the dedicated manufacturing steps, the number of manufacturing steps can be decreased. This leads to a reduction in cost.

Subsequently, anodization is performed to form the anodized films 10 and 9 on the surface of the auxiliary capacitance line 6 and the surface of the scanning line 4 including the upper surface of the gate electrode 8. In this case, since the reflecting layer 7 is in the form of an independent island isolated from the auxiliary capacitance line 6 and the scanning line 4 including the gate electrode 8, no anodizing current is supplied to the reflecting layer 7, and hence no anodized film is formed on the surface of the reflecting layer 7. As described above, when patterning is performed before anodization, anodization can be done without forming any resist for masking on the reflecting layer 7 which is a non-anodized portion. This prevents an increase in the number of processes.

The gate insulating film 11 made of silicon nitride, an intrinsic amorphous silicon film 42, and a silicon nitride film are consecutively formed on the entire upper surface of the second substrate 1 including the upper surfaces of the gate electrodes 8 and the like by the CVD method. By patterning the silicon nitride film using the photolithographic method, the channel protective films 13 are formed. A natural oxide film (not shown) formed on the upper surface of the intrinsic amorphous silicon film 42 is removed by using $NH_4F$ solution.

Figure 5:
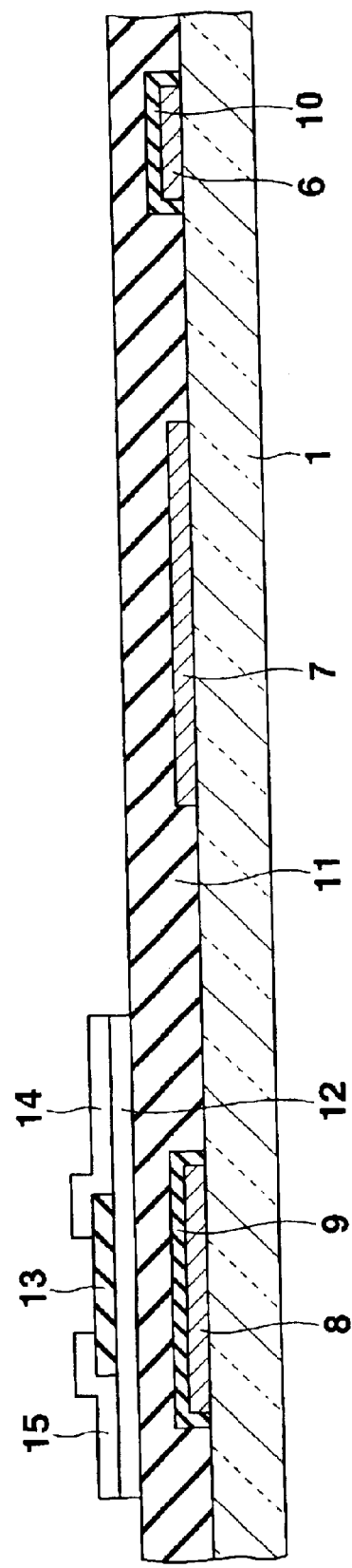
FIG. 5 is an enlarged sectional view for explaining a manufacturing step following the step in FIG. 4.

As shown in FIG. 4, an n-type amorphous silicon film 43 is formed on the entire upper surface of the intrinsic amorphous silicon film 43 including the upper surfaces of the channel protective films 13 by the CVD method. The ohmic contact layers 14 and 15 and thin semiconductor films 12 are then formed by continuously patterning the n-type amorphous silicon film 43 and intrinsic amorphous silicon film 42 by the photolithographic method, as shown in FIG. 5.

Figure 6:
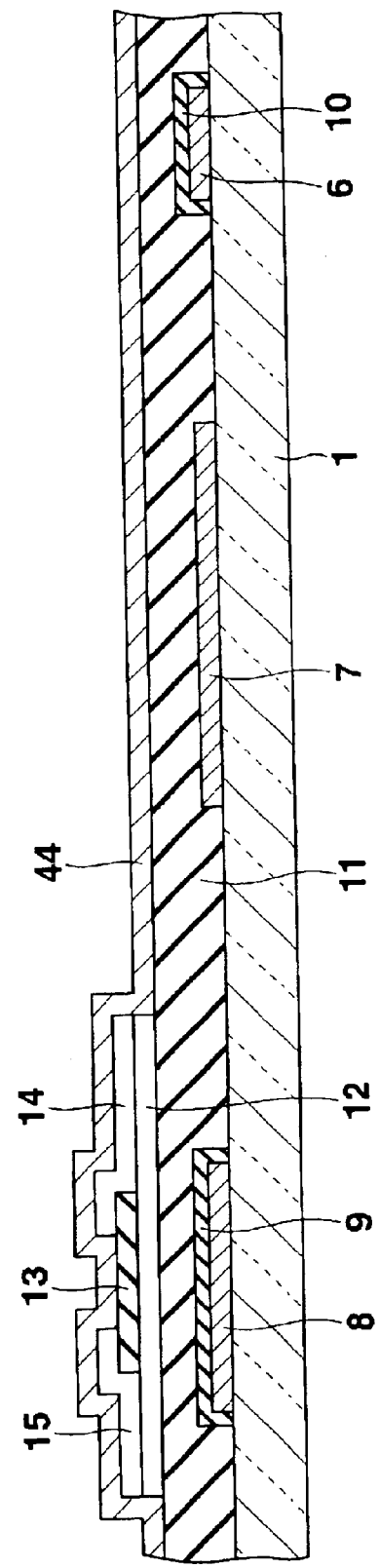
FIG. 6 is an enlarged sectional view for explaining a manufacturing step following the step in FIG. 5.

As shown in FIG. 6, a metal film 44 made of an aluminum-based metal or the like is formed on the entire upper surface of the gate insulating film 11 including the upper surfaces of the channel protective film 13 and ohmic contact layers 14 and 15 by the sputtering method. The metal film 44 is then pattered by the photolithographic method to form the data lines 5 including the source electrodes 16 and drain electrodes 17, as shown in FIG. 1.

The overcoat film 18 made of silicon nitride is formed on the entire upper surfaces of the reflecting layers 7 including the upper surfaces of the thin-film transistors 3 by the CVD method. The contact hole 19 is formed in a portion of this overcoat film 18 which corresponds to a predetermined portion of the source electrode 16 by the photolithographic method.

An ITO film is then formed on the entire upper surface of the overcoat film 18 including the inside of the contact hole 19 by the sputtering method. The ITO film is then patterned by the photolithographic method to form a plurality of pixel electrodes 2 spaced apart from each other. Each pixel electrode formed in this manner is connected to the source electrode 16 through the contact hole 19. The aligning film 20 is formed on the upper surface of the overcoat film 18 including the upper surfaces of the pixel electrodes 2. As shown in FIG. 1, with this process, a thin-film transistor panel can be obtained, in which the thin-film transistors 3, pixel electrodes 2, and reflecting layers 7 are arranged on the second substrate 1 in the form of a matrix.

(Second Embodiment)

Figure 7:
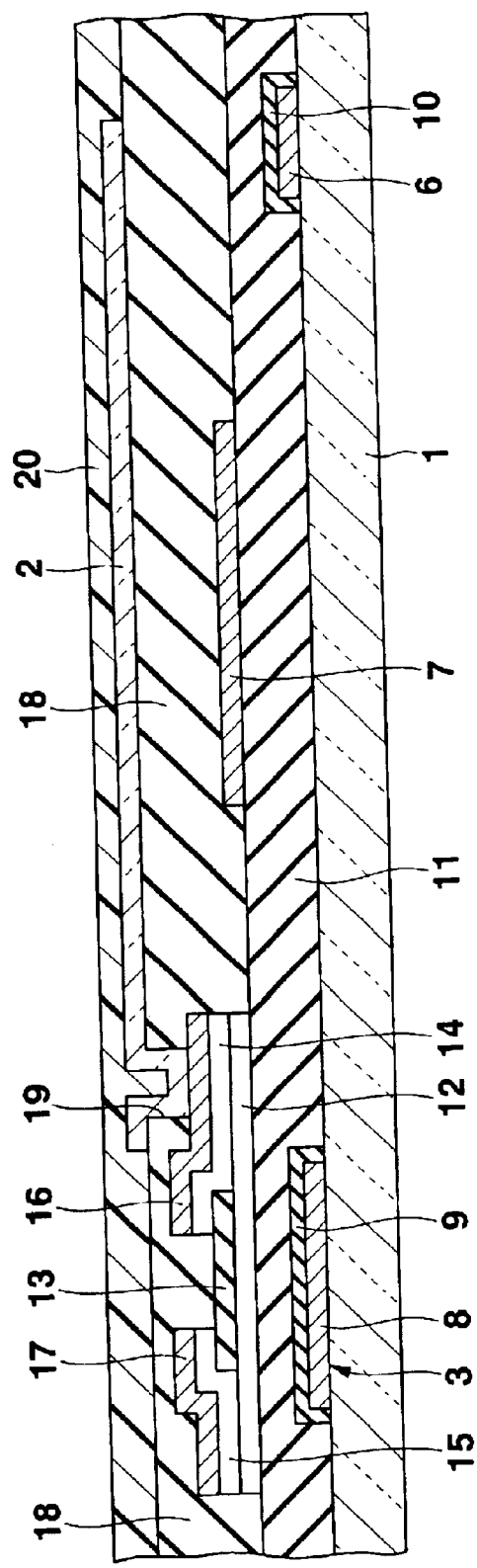
FIG. 7 is an enlarged sectional view of a part of a liquid crystal display apparatus on the thin-film transistor substrate side, according to a second embodiment of the present invention, which is cut at the same position as in FIG. 1.

FIG. 7 is an enlarged sectional view of a part of a liquid crystal display apparatus on a thin-film transistor substrate side, according to a second embodiment of the present invention, which is cut at the same position as that in FIG. 1. This liquid crystal display apparatus differs from that shown in FIG. 1 in that a reflecting layer 7 is formed on the upper surface of a gate insulating film 11 instead of the upper surface of a second substrate 1.

An example of a manufacturing method for the second substrate 1 side of this liquid crystal display apparatus will be partly described next. In this case, when a metal film 41 made of a high-reflectance material such as an aluminum-based material or silver is formed on the entire upper surface of the second substrate 1 by the sputtering method, and then auxiliary capacitance lines 6 and scanning lines 4 including a gate electrodes 8 are formed by the photolithographic method, no reflecting layers 7 are formed unlike in the first embodiment. As the same as shown in FIG. 6, then, a metal film 44 made of an aluminum-based metal or the like is formed on the entire upper surface of the gate insulating film 11 including thin semiconductor films 12 and ohmic contact layers 14 and 15 by the sputtering method. This metal film 44 is pattered by the photolithographic method to form data lines 5 including source electrodes 16 and drain electrodes 17. At the same time, as shown in FIG. 7, the reflecting layers 7 in the form of an independent island are formed, each of which is isolated from the data line 5 including the source electrode 16 and drain electrode 17.

In this case, since the reflecting layer 7 is formed from the metal film 44 made of the same material as that for the source electrode 16 and drain electrode 17, i.e., a high-reflectance aluminum-based metal, at the same time as the formation of the source electrode 16, drain electrode 17, and the like, an increase in the number of manufacturing steps can be prevented. In this case as well, therefore, as compared with the case wherein conventional half mirrors are manufactured in the dedicated manufacturing steps, the number of manufacturing steps can be decreased. This leads to a reduction in cost.

(Third Embodiment)

Figure 8:
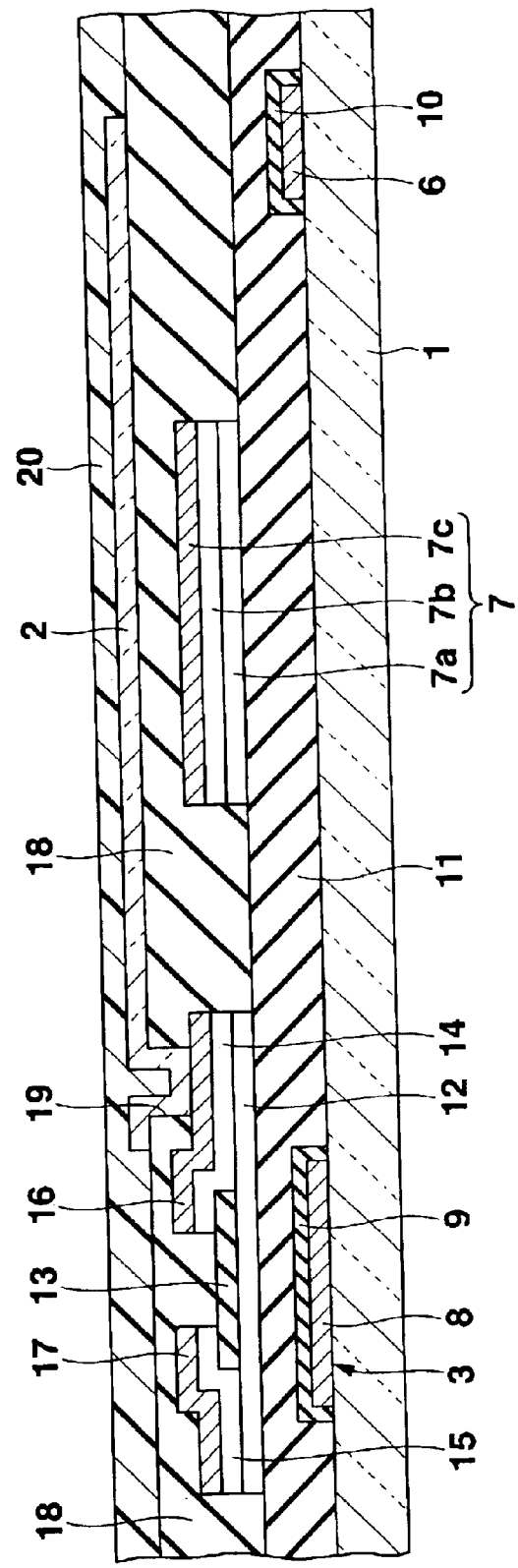
FIG. 8 is an enlarged sectional view of a part of a liquid crystal on the thin-film transistor substrate side, according to a third embodiment of the present invention, which is cut at the same position as in FIG. 7.

FIG. 8 is an enlarged sectional view of a part of a liquid crystal display apparatus on the thin-film transistor substrate side, according to a third embodiment of the present invention, which is cut at the same position as that in FIG. 7. This liquid crystal display apparatus differs from that shown in FIG. 7 in that a reflecting layer 7 formed on a gate insulating film 11 has a three-layer structure constituted by an intrinsic amorphous silicon layer 7a, n-type amorphous silicon layer 7b, and aluminum-based metal layer 7c formed in the order named, instead of a single-layer structure formed from the aluminum-based metal layer.

An example of a manufacturing method for a second substrate 1 side of this liquid crystal display apparatus will be partly described next. In this case as well, as in the second embodiment, when a metal film 41 formed on the entire surface of the second substrate 1 is patterned, only auxiliary capacitance lines 6 and scanning lines 4 including gate electrodes 8 are formed, but no reflecting layers 7 are formed. A metal film 44 made of an aluminum-based metal as same as shown in FIG. 6 is continuously formed on the entire upper surface of an n-type amorphous silicon film 43 as same as shown in FIG. 4 by the sputtering method.

As shown in FIG. 8, source electrodes 16, drain electrodes 17, ohmic contact layers 14 and 15, thin semiconductor films 12, and the like are formed by continuously patterning the metal film 44, the n-type amorphous silicon film 43, and an intrinsic amorphous silicon film 42. At the same time, the reflecting layer 7 having a three-layer structured constituted by the intrinsic amorphous silicon layer 7a, n-type amorphous silicon layer 7b, and aluminum-based metal layer 7c formed in the order named is formed at a predetermined portion of the upper surface of the gate insulating film 11.

In this case, although the reflecting layer 7 has a three-layer structure, since the aluminum-based metal layer 7c which is the uppermost layer is formed by using the same material as that for the source electrode 16 and drain electrode 17, i.e., the high-reflectance metal film 44 made of an aluminum-based metal or the like, at the same time as the formation of the source electrode 16 and drain electrode 17, an increase in the number of manufacturing steps can be prevented. In this case as well, as compared with the case wherein conventional half mirrors are manufactured in the dedicated manufacturing steps, the number of manufacturing steps can be decreased. This leads to a reduction in cost.

(Fourth Embodiment)

Figure 9:
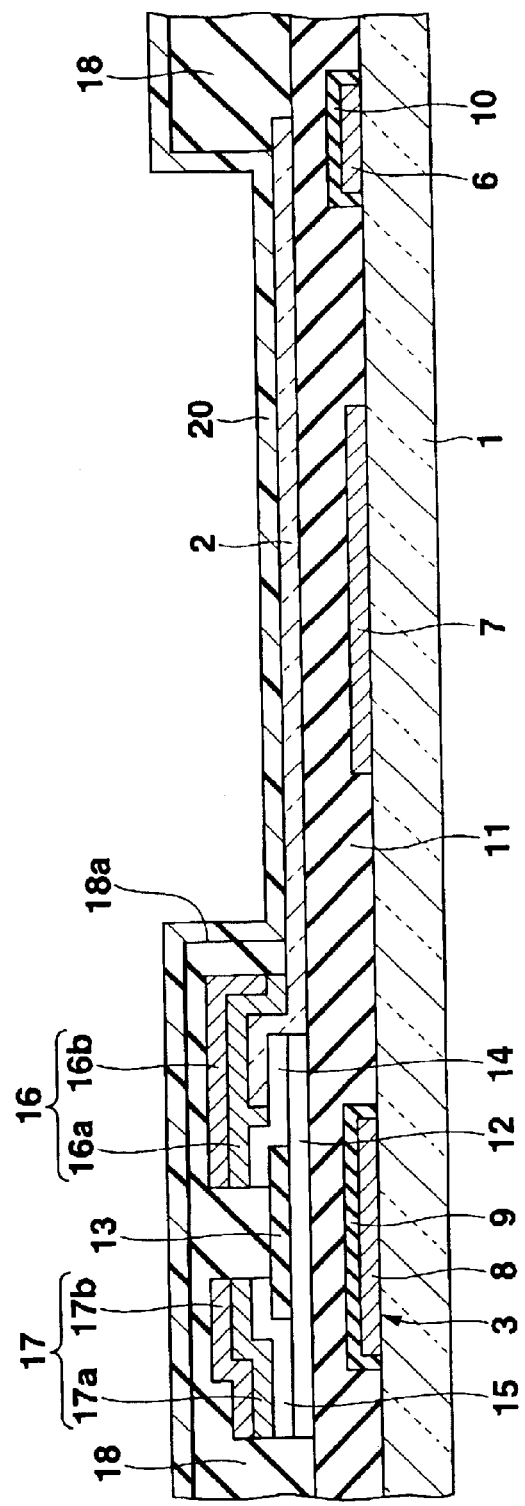
FIG. 9 is an enlarged sectional view of a part of a liquid crystal display apparatus on the thin-film transistor substrate side, according to a fourth embodiment of the present invention, which is cut at the same position as in FIG. 1.

FIG. 9 is an enlarged sectional view of a part of a liquid crystal display apparatus on the thin-film transistor substrate, according to a fourth embodiment of the present invention, which is cut at the same position as that in FIG. 1. This liquid crystal display apparatus greatly differs from that shown in FIG. 1 in that a pixel electrode 2 is formed on a gate insulating film 11 instead of an overcoat film 18, and a source electrode 16, drain electrode 17, and the like each have a two-layer structure constituted by a chromium-based metal layer 16a or 17a made of chromium, chromium alloy, or the like and an aluminum-based metal layer 16b or 17b, which are formed in the order named, instead of a single-layer structure.

Figure 10:
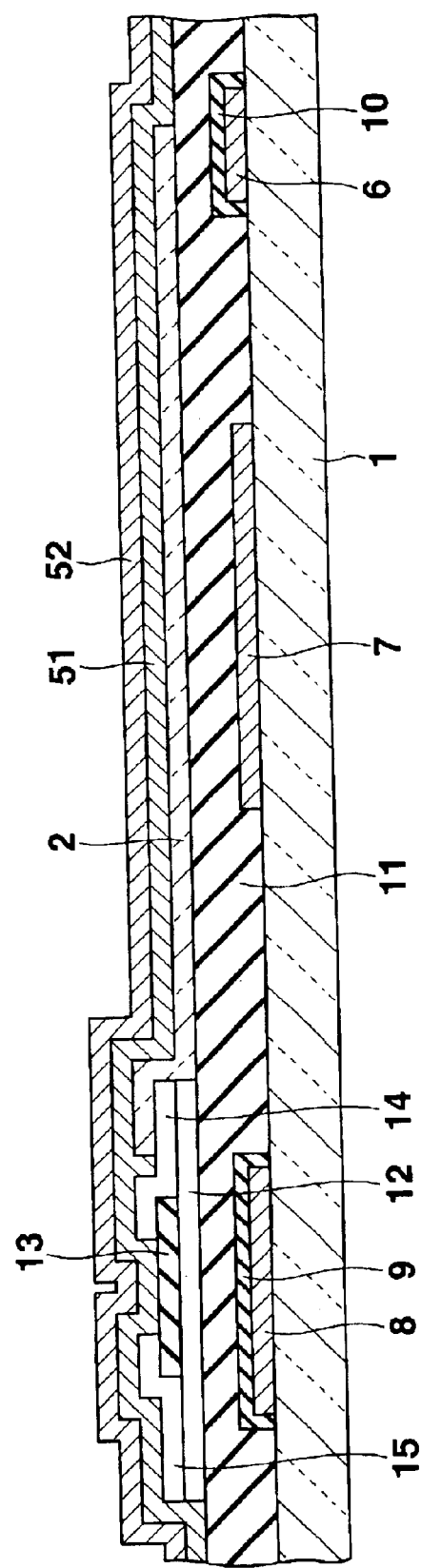
FIG. 10 is an enlarged sectional view for explaining manufacturing steps in manufacturing the part on the thin-film transistor substrate shown in FIG. 9.

An example of a manufacturing method for the second substrate 1 side of this liquid crystal display apparatus will be partly described next. In this case, in the state shown in FIG. 5, as shown in FIG. 10, the pixel electrode 2 made of ITO is formed on a predetermined portion of the upper surface of one ohmic contact layer 14 and on a predetermined portion of the upper surface of the gate insulating film 11. A chromium-based metal layer 51 and aluminum-based metal layer 52 are consecutively formed on the entire surface of the gate insulating film 11 including the pixel electrodes 2, channel protective films 13, ohmic contact layers 14, and ohmic contact layers 15, as sown in FIG. 10.

The aluminum-based metal layer 52 and chromium-based metal layer 51 are then consecutively patterned to form the source electrodes 16 and drain electrodes 17 each having a two-layer structure constituted by the chromium-based metal layer 16a or 17a and the aluminum-based metal layer 16b or 17b which are formed in the order named, as shown in FIG. 9. The overcoat film 18 made of silicon nitride is formed on the entire upper surface of the gate insulating film 11 including the pixel electrodes 2, thin-film transistors 3, and the like. An opening portion 18a is then formed in a portion of the overcoat film 18 which corresponds to a predetermined portion of the pixel electrode 2. An aligning film 20 is formed on the upper surface of the overcoat film 18 including the pixel electrodes 2.

In the fourth embodiment, since the reflecting layer 7 is formed in the same manner as in the first embodiment, an increase in the number of manufacturing steps can be prevented as in the first embodiment. In this case, therefore, as compared with the case wherein conventional half mirrors are manufactured in the dedicated manufacturing steps, the number of manufacturing steps can be decreased. This leads to a reduction in cost.

(Fifth Embodiment)

Figure 11:
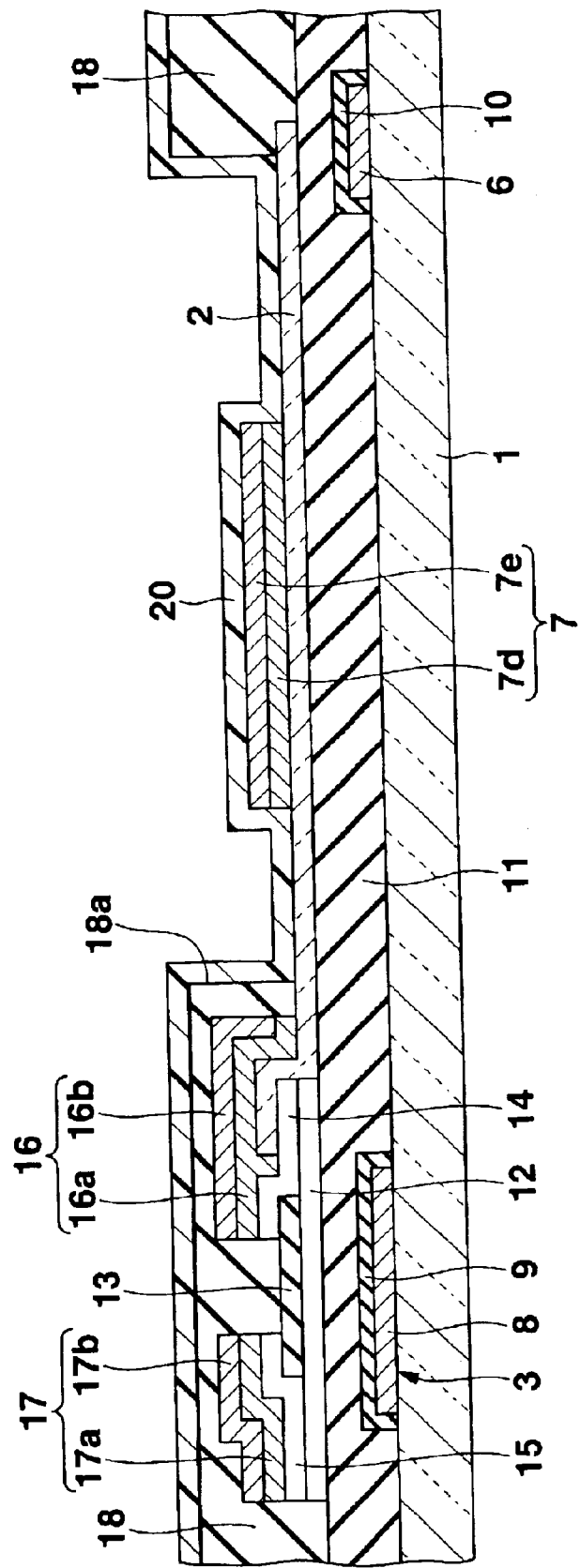
FIG. 11 is an enlarged sectional view of a part of a liquid crystal display apparatus on the thin-film transistor substrate side, according to a fifth embodiment of the present invention, which is cut at the same position as in FIG. 9.

FIG. 11 is an enlarged sectional view of a part of a liquid crystal display apparatus on a thin-film transistor substrate, according to a fifth embodiment of the present invention, which is cut at the same position as that in FIG. 9. This liquid crystal display apparatus differs from that shown in FIG. 9 in that a reflecting layer 7 is formed on a pixel electrode 2 through a gate insulating film 11 instead of a thin-film transistor substrate 1, and the reflecting layer 7 has a two-layer structure constituted by a chromium-based metal layer 7d and aluminum-based metal layer 7e formed in the order named, instead of a single-layer structure formed from an aluminum-based metal layer.

A manufacturing method for the part on the thick-film transistor substrate 1 of this liquid crystal display apparatus will be described next. In this case, in the state as the same as shown in FIG. 10, by consecutively patterning a chromium-based metal layer 51 and aluminum-based metal layer 52, source electrodes 16 and drain electrodes 17 each having a two-layer structure are formed, which is constituted by a chromium-based metal layer 16a or 17a and an aluminum-based metal layer 16b or 17b formed in the order named, and at the same time, the reflecting layer 7 having a two-layer structure constituted by a chromium-based metal layer 7d and aluminum-based metal layer 7e formed in the order named is formed on a predetermined portion of the upper surface of the pixel electrode 2, as shown in FIG. 11.

In this case, although the reflecting layer 7 has a two-layer structure, since the reflecting layer 7 is formed by using the same material as that for the source electrode 16 and drain electrode 17, i.e., a high-reflectance metal film made of a material including a high-reflectance aluminum-based metal layer, at the same time as the formation of the source electrode 16 and drain electrode 17, an increase in the number of manufacturing steps can be prevented. In this case as well, as compared with the case wherein conventional half mirrors are manufactured in the dedicated manufacturing steps, the number of manufacturing steps can be decreased. This leads to a reduction in cost.

(Modification of Each Embodiment)

Figure 12:
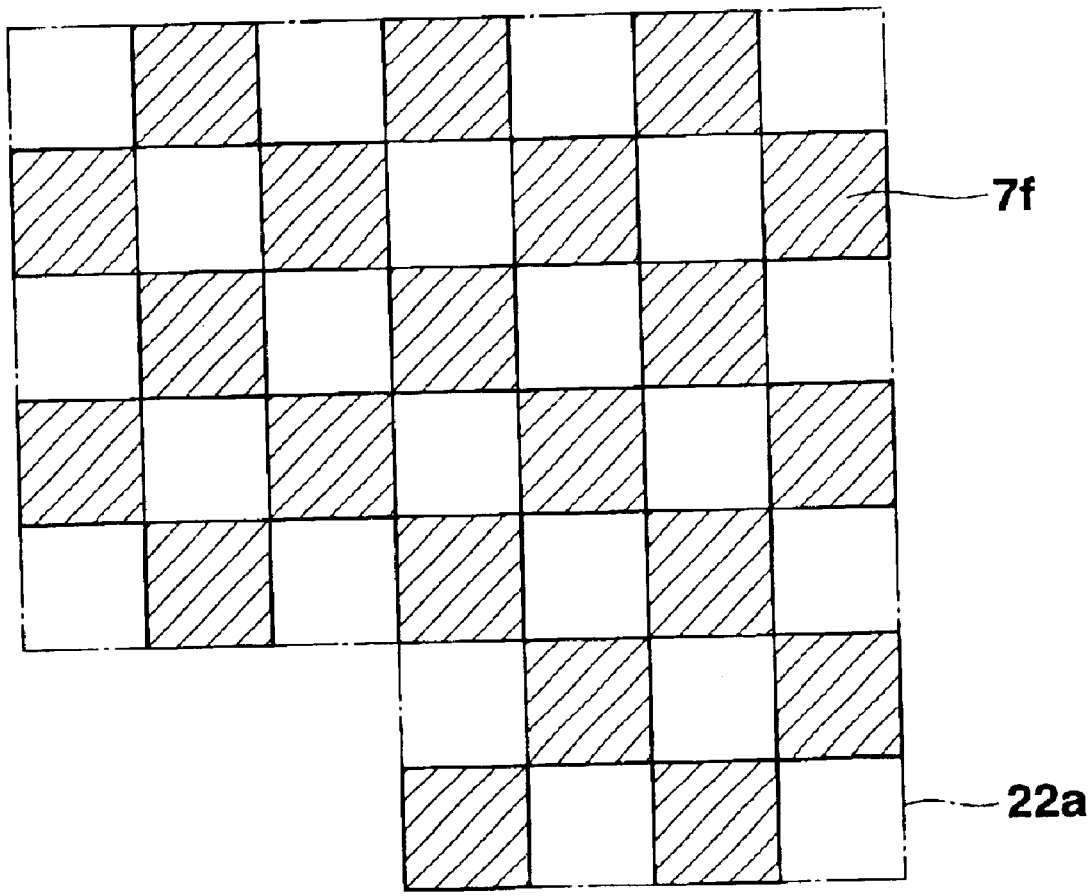
FIG. 12 is a plan view for explaining another example of a reflecting layer.

Note that each embodiment described above has exemplified the case wherein the non-light-transmitting reflecting layer 7 is formed in a solid or integrated state throughout the entire area. In each embodiment described above, however, a plurality of point-like reflecting layers 7f made of a non-light-transmitting material may be arranged, as indicated by the hatching, with respect to the opening portion 22a of the black mask indicated by one-dot dash lines, as shown in FIG. 12. The small rectangular reflecting layers 7f may be arranged in a pattern in which they are partly connected to each other (in this case, the reflecting layers 7f may constitute a single continuous pattern or a plurality of patterns), or in a discrete state in which they are isolated from each other. In addition, the reflecting layers 7f may be arranged into the pattern or discrete state regularly or irregularly. In brief, the ratio of the total area of non-light-transmitting reflecting layers 7f to the area of the opening portion 22a of the black mask is preferably set to a proper value of about 35% to 65% in accordance with the operating environment.

In each embodiment described above, a fine uneven pattern may be formed on the surface of the reflecting layer 7 by wet etching, dry etching, or another proper method. When a fine uneven pattern is formed on the upper surface of the reflecting layer 7, a uniformity of reflection for every direction by the reflecting layer 7 is improved. When, therefore the apparatus is used as a reflection type, the display quality improves. For the same purpose, the structure exemplified by the sixth embodiment can be used.

(Sixth Embodiment)

Figure 13:
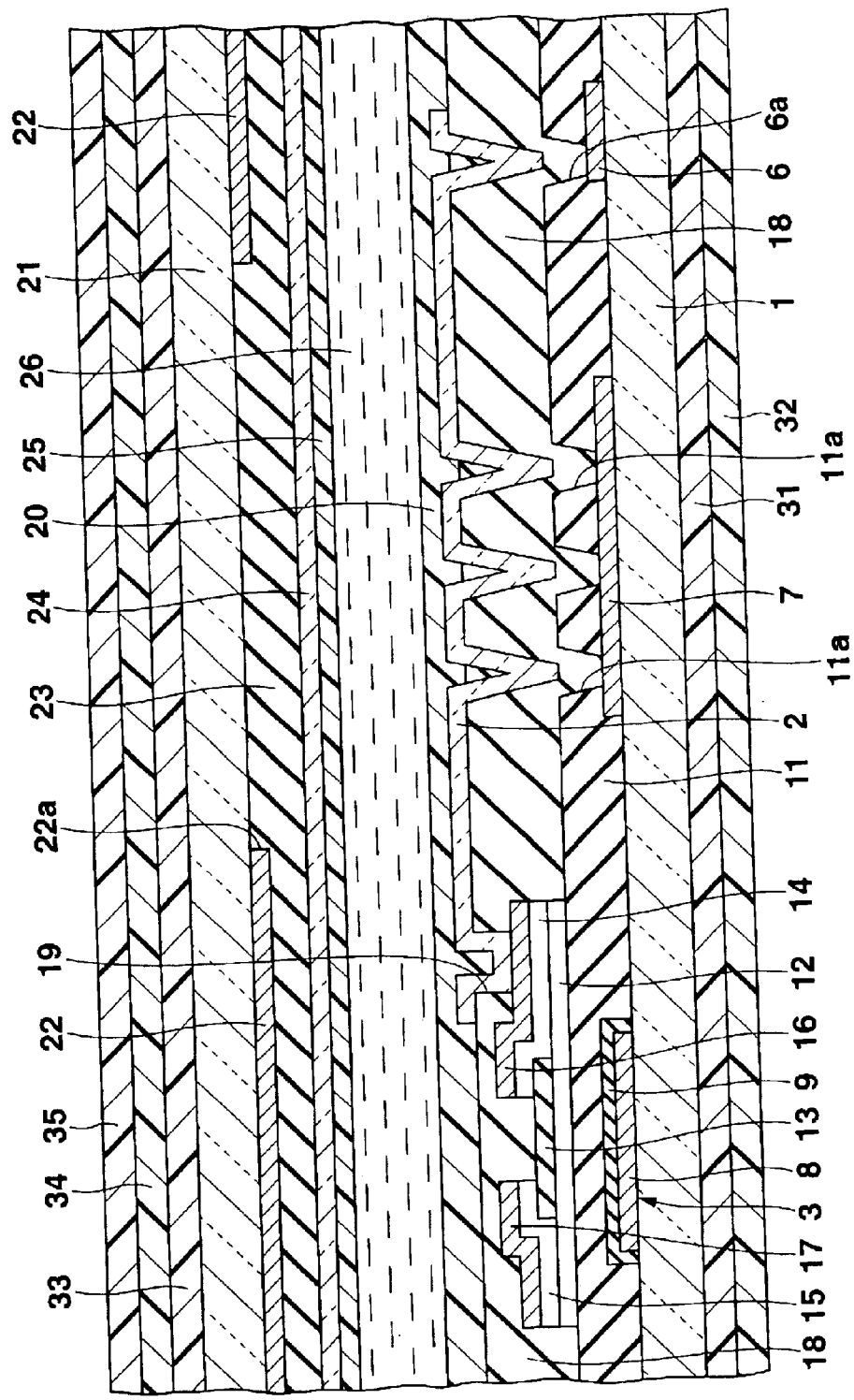
FIG. 13 is an enlarged sectional view of a part of a liquid crystal display apparatus on the thin-film transistor substrate side, according to a sixth embodiment of the present invention, which is cut at the same position as in FIG. 1.

A characteristic feature of a sixth embodiment shown in FIG. 13 is that many sloped through holes 11a each defined with an inclined surface are formed in the region of a gate insulating film 11 which corresponds to each reflecting layer 7 to form an uneven surface within this region of the gate insulating film 11. The surface of an overcoat film 18 is formed into an uneven pattern following the uneven surface formed by the sloped through holes 11a formed in the gate insulating film 11. A light-transmitting pixel electrode 2 formed on the overcoat film 18 is also formed into an uneven pattern having many sloped fine recesses following the uneven surface of the gate insulating film 11. For this reason, light transmitted through the light-transmitting pixel electrode 2 is scattered in this uneven region. When, therefore, this liquid crystal display apparatus is used as a reflection type, the display quality improves.

The sixth embodiment uses a structure in which an auxiliary capacitance line 6 also serves as a reflecting film. That is, in the first to fifth embodiments, the anodized film 10 is formed on the surface of the auxiliary capacitance line 6, whereas in this embodiment, no anodized film is formed on the surface of the auxiliary capacitance line 6. This makes it possible to reflect external light by the auxiliary capacitance line 6 as well. Therefore, the reflectance can be increased, and the area of the reflecting layer 7 made of a non-light-transmitting material can be reduced. As the area of the reflecting layer 7 decreases, the opening ratio increases. This makes it possible to improve brightness and contrast when the apparatus is used as a transmission type. In addition, in this embodiment, many sloped through holes 6a are formed in an region of the gate insulating film 11 which corresponds to the auxiliary capacitance line 6 to make the surface of the gate insulating film 11 uneven within this region. Therefore, uneven surfaces can be formed within the regions of the overcoat film 18 and pixel electrode 2 formed on the surface of the gate insulating film 11. With this structure, the light reflected by the auxiliary capacitance line 6 can be made uniform scattered light with no directivity within the uneven regions.

The sloped through holes 11a or 6a may be formed in the gate insulating film 11 by a generally known isotropic wet etching or dry etching method. This example will be described with reference to FIGS. 14A and 14B.

A scanning line 4 including a gate electrode 8, the auxiliary capacitance line 6, and the reflecting layer 7 are formed on the basis of the manufacturing method of the first embodiment, and the anodized film 9 is formed on the surface of the gate electrode 8. In this case, the auxiliary capacitance line 6 may be insulated in advance from an anode electrode (not shown) to prevent an anodized film from being formed on the auxiliary capacitance line 6 as well as the reflecting layer 7. Alternatively, the entire surface of the auxiliary capacitance line 6 is covered with a resist in advance.

Figure 14A:
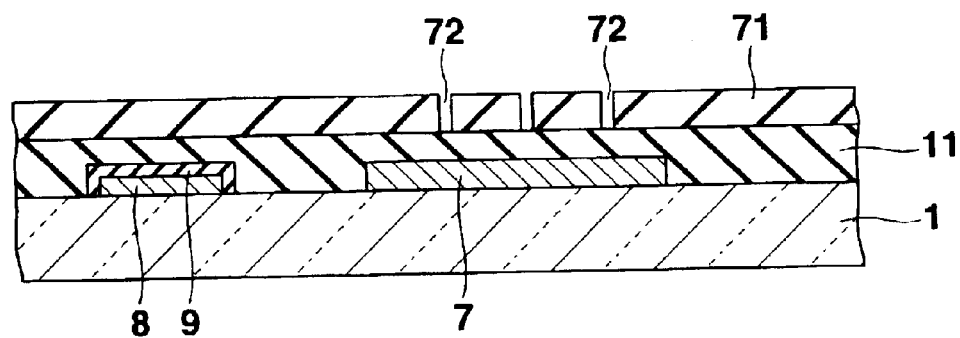
FIG. 14A is an enlarged sectional view for explaining manufacturing steps in manufacturing a part on the thin-film transistor substrate shown in FIG. 13.
Figure 14B:
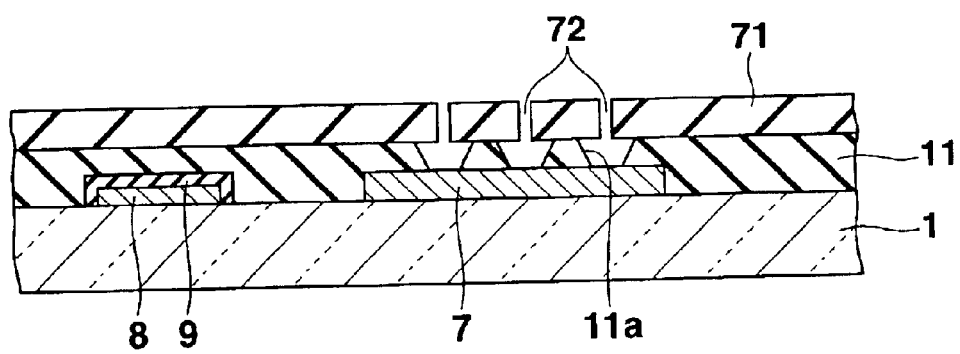
FIG. 14B is an enlarged sectional view for explaining steps following the steps in FIG. 14A.

The gate insulating film 11 is formed on the upper surface of the thin-film transistor substrate 1 including the upper surfaces of the scanning lines 4 including the gate electrodes 8, the upper surfaces of the auxiliary capacitance lines 6, and the upper surfaces of the reflecting layers 7 by the CVD method or the like. As shown in FIG. 14A, a resist pattern 71 having openings 72 formed in predetermined portions is formed on the upper surface of the gate insulating film 11. As shown in FIG. 14B, when the gate insulating film 11 is wet-etched by using the resist pattern 71 as a mask, etching progresses isotropically, thereby forming the sloped through holes 11a in the part of the gate insulating film 11 on the reflecting layer 7.

In this case, the depth of each sloped through hole 11a formed in the gate insulating film 11 on the reflecting layer 7 becomes equal to the thickness of a portion of the gate insulating film 11 which substantially functions as a gate insulating film (between the gate electrode 8 and a thin semiconductor film 12). Therefore, the depths of all the sloped through holes 11a formed in the gate insulating film 11 can be made uniform, leading to uniform scattering/reflecting characteristics. Thereafter, the resist pattern 71 is removed.

After this process, an overcoat film 49 and the pixel electrode 2 formed on the upper surface of the gate insulating film 11 including the inside of each sloped through hole 11a are formed following the uneven surface of the gate insulating film 11. The resultant surface becomes an uneven surface following the uneven surface of the gate insulating film 11 including the sloped through holes 11a and having almost the same size.

The same method as described above can be applied to a case wherein the sloped through holes 6a are formed in the region of the gate insulating film 11 which corresponds to the auxiliary capacitance line 6.

In this sixth embodiment, in order to improve the uniformity of transmitted light when this apparatus is used as a transmission type, the sloped through holes 11a formed in the gate insulating film 11 may be formed in the entire region corresponding to the pixel electrode 2 as well as the corresponding region of the reflecting film 7. This makes it possible to omit the diffusion film 33 shown in FIG. 1.

Note that a combination of the respective embodiments and modification can be applied to the first to sixth embodiments. A thin-film transistor is not limited to a channel protective type transistor, and a channel etch type transistor may be used. A semiconductor layer is not limited to amorphous silicon, and polysilicon or continuous grain boundary silicon may be used. The present invention can be applied to a liquid crystal display apparatus using nonlinear elements such as MIMs in addition to thin-film transistors as switching elements.

As has been described above, according to the present invention, since reflecting layers are formed at positions where the respective transparent pixel electrodes overlap, the regions where the reflecting layers exist become reflecting portions, and the regions where no reflecting layers exist become light-transmitting portions. Therefore, this apparatus can function as a translucent reflection type liquid crystal display apparatus. In this case, when some parts are formed by using a reflective metal material in any one of the manufacturing steps for a liquid crystal display apparatus, e.g., when the gate electrodes and source/drain electrodes of thin-film transistors are formed by using aluminum, the number of manufacturing steps can be decreased by forming reflecting layers at the positions where the respective transparent pixel electrodes overlap at the same time as the formation of the electrodes. This leads to a reduction in cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
   a first substrate;
   a second substrate having an inner surface opposing the first substrate;
   a liquid crystal placed between the first and second substrates;
   a plurality of light-transmitting pixel electrodes arranged between the inner surface of the second substrate and the liquid crystal;
   a plurality of switching elements each comprising a thin transistor including a gate electrode, a source electrode and a drain electrode, wherein each of the plurality of switching elements is electrically connected to a corresponding one of the pixel electrodes;
   a plurality of reflecting layers, wherein each of the plurality of reflecting layers is placed between a corresponding one of the pixel electrodes and the inner surface of the second substrate and has an area smaller than an area of the corresponding pixel electrode; and
   an insulating layer provided between the pixel electrodes and the reflecting layers;
   wherein the reflecting layers and the gate electrode of each of the switching elements are provided in a same plane of the liquid crystal display apparatus and are formed from a same material, and the reflecting layers are positioned independently so as to be disconnected from each other and from the electrodes of the switching elements; and
   wherein an oxide film is provided on a surface of the gate electrode of each of the switching elements but not on a surface of each of the reflecting layers.

2. An apparatus according to claim 1, wherein the reflecting layers are formed in a solid state using a non-light-transmitting material.

3. An apparatus according to claim 1, wherein the reflecting layers are formed in a pattern or discrete state using non-light-transmitting material.

4. The apparatus according to claim 1, further comprising an auxiliary capacitance line formed on the inner surface of the second substrate.

5. The apparatus according to claim 4, wherein the reflecting layers and the auxiliary capacitance line are provided in the same plane and are formed from the same material.

6. The apparatus according to claim 5, further comprising an anodized film formed on the auxiliary capacitance line.

7. The apparatus according to claim 5, wherein the auxiliary capacitance line is formed from a high-reflectance metal film.

8. The apparatus according to claim 1, wherein the area of each said reflecting layer is 35 to 65% of the area of the corresponding pixel electrode.

9. The apparatus according to claim 1, further comprising a diffusion layer positioned on an opposite side of the first substrate with respect to the second substrate.

10. The apparatus according to claim 1, wherein a surface of each of the pixel electrodes is uneven at at least a region corresponding to the reflecting layers.

11. A liquid crystal display apparatus comprising:
    a first substrate;
    a second substrate having an inner surface opposing the first substrate;
    a liquid crystal placed between the first and second substrates;
    a plurality of light-transmitting pixel electrodes arranged between the inner surface of the second substrate and the liquid crystal;
    a reflecting layer which is positioned between each of the pixel electrodes and the inner surface of the second substrate and which has an area smaller than an area of the pixel electrode;
    an insulating layer positioned between the pixel electrodes and the reflecting layer, and
    a plurality of fine sloped through holes formed in the insulating layer.

12. The apparatus according to claim 11, further comprising an auxiliary capacitance line made of a high-reflectance metal and positioned on the inner surface of the second substrate.

13. The apparatus according to claim 12, wherein a surface of each of the pixel electrodes is uneven at at least a region corresponding to the reflecting layers.

14. The apparatus according to claim 13, wherein the insulating layer is positioned between the pixel electrodes and the auxiliary capacitance line.

15. A method of manufacturing a liquid crystal display apparatus in which a liquid crystal is sealed between a first substrate and a second substrate, said method comprising:

forming a high-reflectance material on an inner surface of the second substrate opposing the first substrate;

forming reflecting layers and a line which is electrically disconnected from the reflecting layers by patterning the high-reflectance material;

anodizing at least a portion of a surface of the line;

forming an insulating layer on the second substrate over the reflecting layers and the line;

forming light-transmitting pixel electrodes in a matrix on and over the insulating layer such that an area of each of the pixel electrodes is larger than an area of a corresponding one of the reflecting layers and such that at least part of said each pixel electrode overlaps the corresponding one of the reflecting layers; and forming a switching element on the inner surface of the second substrate, said switching element including the anodized portion of the line;

wherein the reflecting levers do not have anodized surfaces, and the reflecting layers and the anodized portion of the line are formed from a same material in a same plane of the liquid crystal display apparatus.

16. The method according to claims 15, wherein the area of each said reflecting layer is 35 to 65% of the area of the corresponding pixel electrode.

17. The method according to claim 15, further comprising forming a fine uneven pattern on each of the pixel electrodes at at least a region corresponding to the reflecting layers.

18. A method of manufacturing a liquid crystal display apparatus in which a liquid crystal is sealed between a first substrate and a second substrate, said method comprising:

forming reflecting layers on and over an inner surface of the second substrate opposing the first substrate;

forming an insulating layer on the second substrate including the reflecting layers;

forming light-transmitting pixel electrodes in a matrix on and over the insulating layer such that an area of each of the pixel electrodes is larger than an area of a corresponding one of the reflecting layers and such that at least part of said each pixel electrode overlaps the corresponding one of the reflecting layers; and forming a plurality of fine sloped through holes in at least a region of the insulating layer which corresponds to the reflecting layers.

\* \* \* \* \*